March 8, 1960

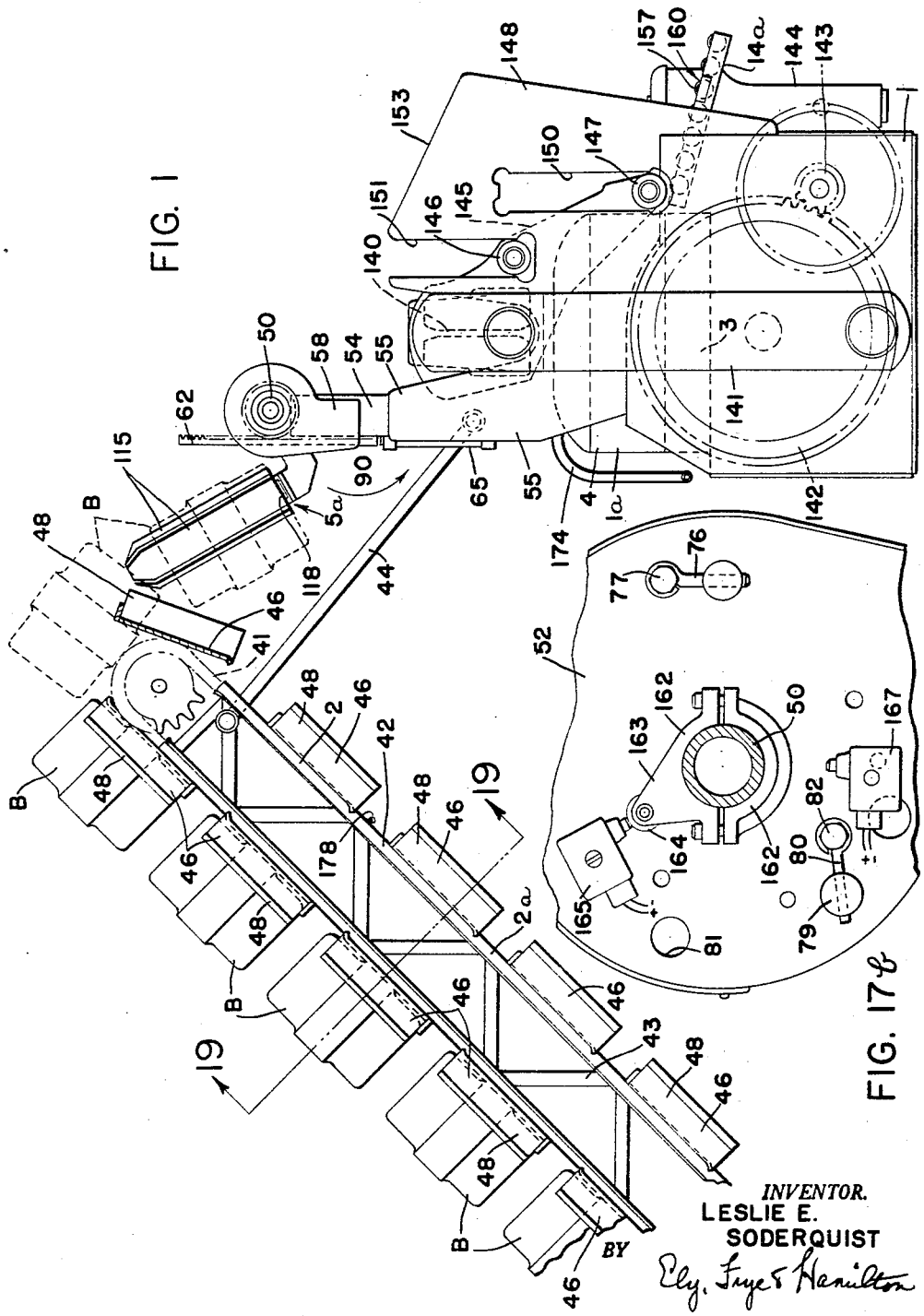

L. E. SODERQUIST 2,927,343

PNEUMATIC TIRE SHAPING AND VULCANIZING PRESS
AND MECHANISM FOR SERVICING SAME

Filed Feb. 24, 1956

*INVENTOR.*
LESLIE E. SODERQUIST
BY Oly, Frye & Hamilton
ATTORNEYS

March 8, 1960 L. E. SODERQUIST 2,927,343
PNEUMATIC TIRE SHAPING AND VULCANIZING PRESS
AND MECHANISM FOR SERVICING SAME
Filed Feb. 24, 1956 11 Sheets-Sheet 3

INVENTOR.
LESLIE E. SODERQUIST
BY
ATTORNEYS

INVENTOR.
LESLIE E. SODERQUIST
BY Ely, Frye & Hamilton
ATTORNEYS

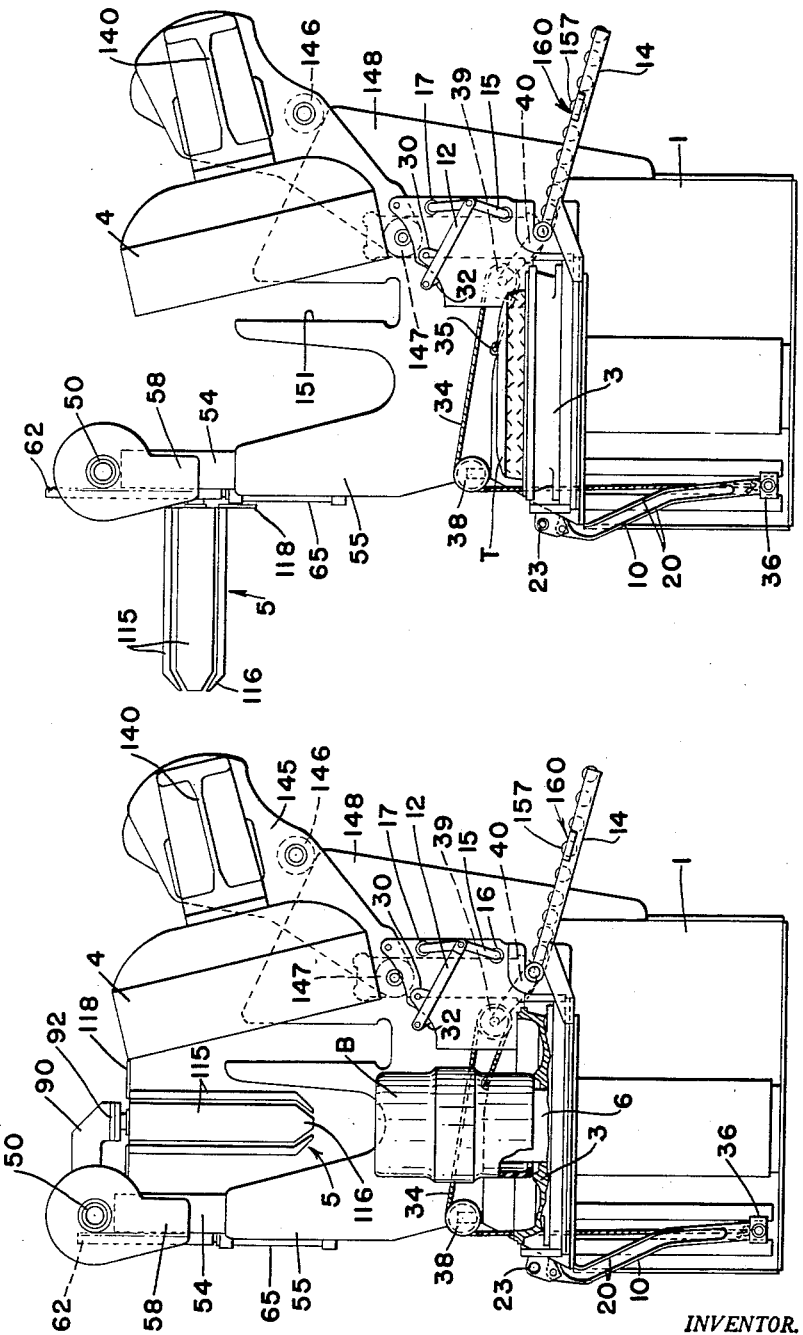

INVENTOR.
LESLIE E. SODERQUIST
BY
ATTORNEYS

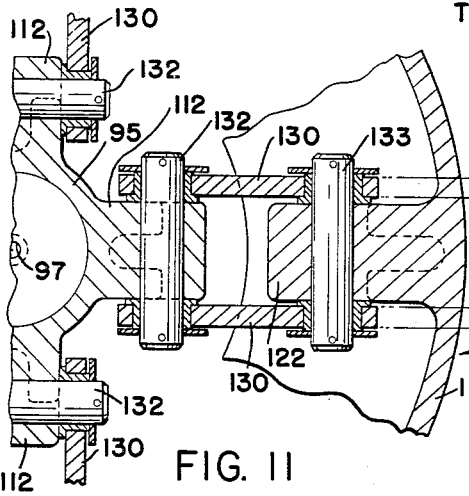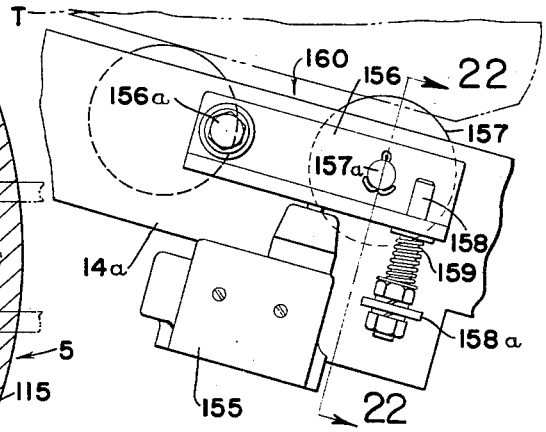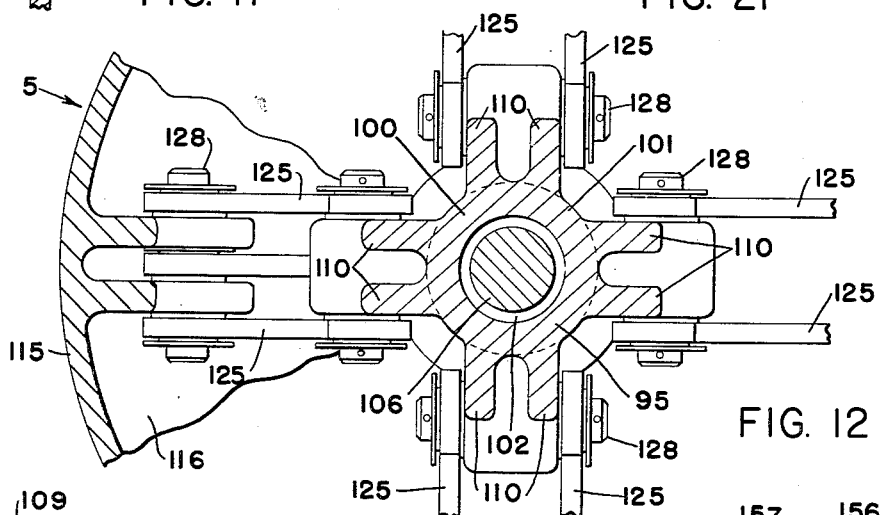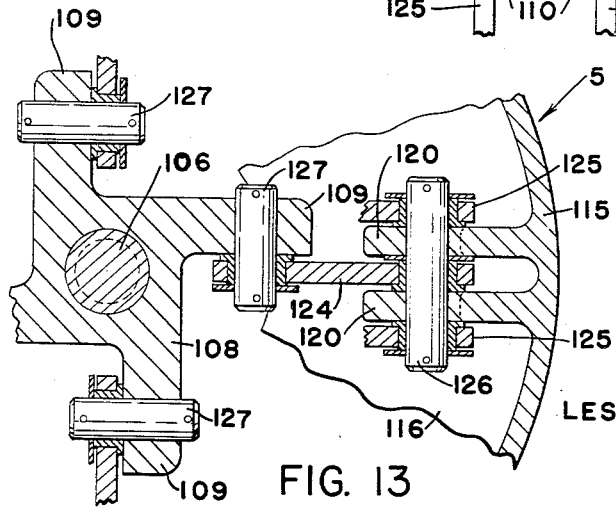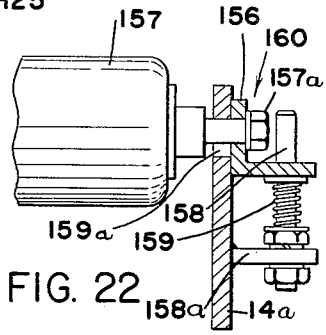

March 8, 1960 L. E. SODERQUIST 2,927,343
PNEUMATIC TIRE SHAPING AND VULCANIZING PRESS
AND MECHANISM FOR SERVICING SAME
Filed Feb. 24, 1956 11 Sheets-Sheet 8

INVENTOR.
LESLIE E. SODERQUIST
BY Ely, Frye & Hamilton
ATTORNEYS

*INVENTOR.*
LESLIE E. SODERQUIST
BY Ely, Frye & Hamilton
ATTORNEYS

United States Patent Office 2,927,343
Patented Mar. 8, 1960

2,927,343

PNEUMATIC TIRE SHAPING AND VULCANIZING PRESS AND MECHANISM FOR SERVICING SAME

Leslie E. Soderquist, Silver Lake, Ohio, assignor to The McNeil Machine & Engineering Company, Akron, Ohio, a corporation of Ohio Application February 24, 1956, Serial No. 567,555

15 Claims. (Cl. 18—2)

The present invention relates to improvements in presses having separable mold sections for the shaping and vulcanizing of pneumatic tires, but more especially to a mechanism operating in conjunction with presses of this type for automatically supplying such presses with the uncured tire bands and discharging the cured tires from the presses.

In order to successfully equip presses of the type specified with a mechanism to serve these presses, the mechanism which delivers an uncured band to the press must register with the press mold sections and must be operated in timed relation to the mechanism which discharges the cured tire, and these operations must in turn be timed properly with the operation of the press itself.

These several considerations have been adequately provided for in the mechanism which is disclosed herein.

The press which is shown herein and which will be described only to the extent which is necessary for a complete understanding of the invention is shown in a number of prior patents and applications to the present inventor. These presses are well known in the art and are characterized by the provision of an inflatable diaphragm about which the green or uncured band is placed, a pair of mold sections of which the upper one is movable toward and from the lower section, and means to inflate the diaphragm during the closing of the press and during the curing time. After the cure, the press is opened by a timing mechanism, the cured tire raised from the lower mold section, the diaphragm stripped from the tire, and the tire raised to a position from which it can be readily removed.

While several types and forms of presses as described have been designed by the applicant and are in successful operation, that form shown in applicant's prior Patent No. 2,808,618, dated October 8, 1957, has been selected for the purpose of illustrating the present invention. Reference may be made to that patent for such details as may be desired. The press has the feature that the upper mold is tilted backwardly to a sufficient extent to enable the band to be placed over the former from above.

It will be understood, however, that while it is preferred to utilize the mechanism shown and described herein with the type of press employing an inflatable diaphragm, this is not essential to all forms of the invention, it being possible to use certain portions of the invention with that type of press in which the tire is cured without the intervention of a diaphragm, so long as the uncured tire band is in registry with the mold sections. Such a press is shown, for example, in applicant's prior Patent No. 2,812,544, dated November 12, 1957, to which reference may be made. Presses of the type which do not employ diaphragms are usually equipped with rings or other devices which are brought and held against the beads of the tire during the shaping and curing operations. These rings are in the nature of a former or forming means and, in conjunction with means for inflating the band, act as a substitute for the diaphragm. Hence, where "forming mechanism," "former" or "shaping means," or similar terms are used in the specification or claims, it will be understood that it is intended thereby to cover the diaphragms as well as substitutes or equivalents for the diaphragm.

The press shown herein is provided with means to eject the cured tire from the press. The applicant has heretofore designed a mechanism for this purpose which is shown in prior Patent No. 2,832,991, dated May 6, 1958. The mechanism shown herein employs the basic features of the said patent but is an improvement thereupon. The specific details of the mechanism are described in applicant's Patent No. 2,832,992, dated May 6, 1958. It will be understood, however, that in certain aspects of the present invention it is not necessary to employ a tire ejecting mechanism such as designed by this applicant as other forms of ejecting mechanisms may be used in combination with the other parts of the inventive concept shown and described herein.

In the form of the invention shown herein, the cured tires are discharged from the rear of the press. This is optional merely, as the ejecting mechanism may be faced about so that the tires are ejected at the front of the press.

It is also to be noted that in the preferred form of the invention shown herein, the press is in dual form so that two tires are cured simultaneously. This creates certain complications which are solved in the preferred form, but in many aspects of the invention the improvements may be adapted to a single type press.

It will also be observed that while the invention is shown in combination with a loading conveyor, this is not essential as the mechanism which transfers the uncured band to the former may be fed by hand.

The invention is shown and described in the best known or preferred form and as adapted for commercial use; however, it will be understood that, although the fundamentals may be essential, details thereof are not, and such details may be changed or modified or improved upon without departing from the original inventive concept.

In the drawings, in which the invention is illustrated in its best developed form:

Fig. 1 is a side view of a tire shaping and vulcanizing press equipped with a device for transferring an uncured band to the former or diaphragm, and with a tire ejecting mechanism and an off-bearing conveyor for the cured tire. In this view the press is closed as in the curing operation.

Figure 6:
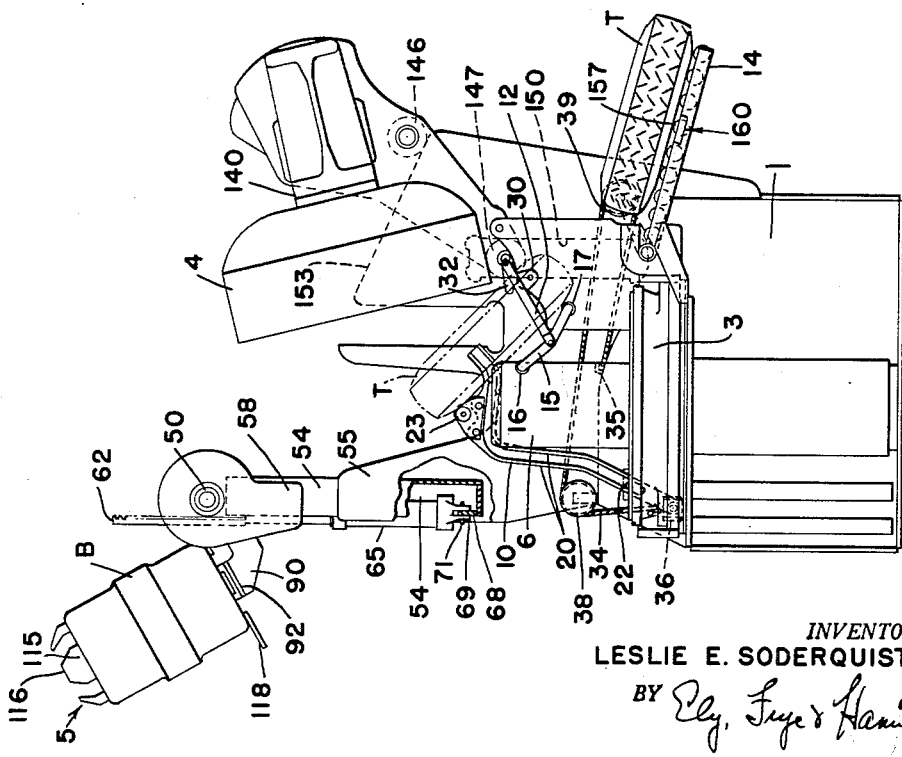

Fig. 6 shows the position of the stripping arms in which the tire is lifted clear of the diaphragm. In this view the tire is shown in dotted lines in the position in which it is tilted so that it will be propelled by gravity out of the press. The full lines show the tire as it passes over the off-bearing conveyor.

Figure 7:
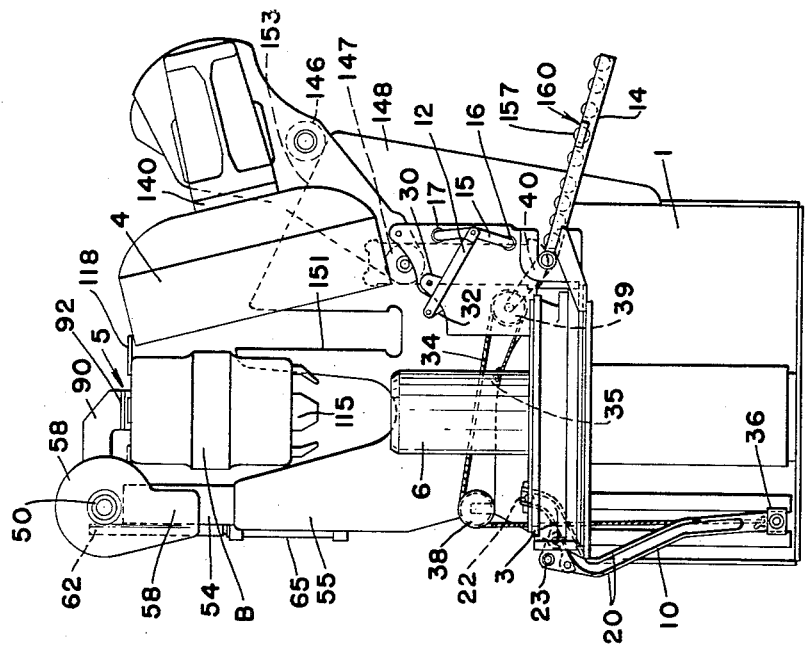

Fig. 7 shows the stripping arms retracted to their idle position and the transfer device moved into position to drop the uncured band over the diaphragm or former.

Fig. 8 shows the band deposited in registry with a lower mold section. After this operation the transfer device will return to the position shown in Fig. 1. In this view the lower mold section is cut away to show the band on its seat in the lower mold section.

Fig. 9 shows the transfer member or chuck moved out of the way and into position for manual loading.

Figure 10:
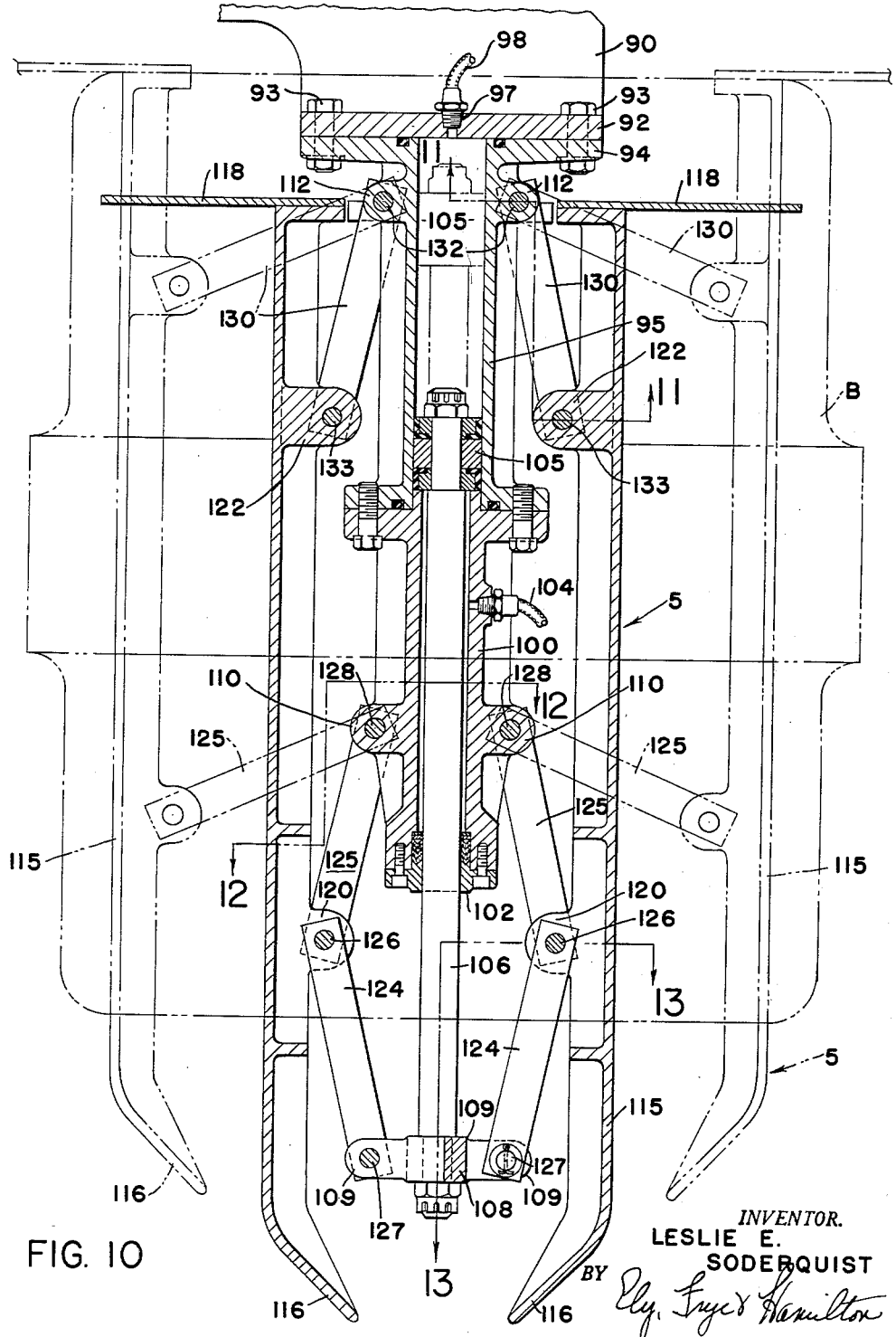

Fig. 10 is an enlarged cross-section of the transfer device or chuck which supports the uncured tire band. In the full lines the chuck is in collapsed condition and in dotted lines in the fully expanded condition.

Figs. 11, 12 and 13 are detail sections on the lines 11—11, 12—12, and 13—13 respectively of Fig. 10.

Figure 14:
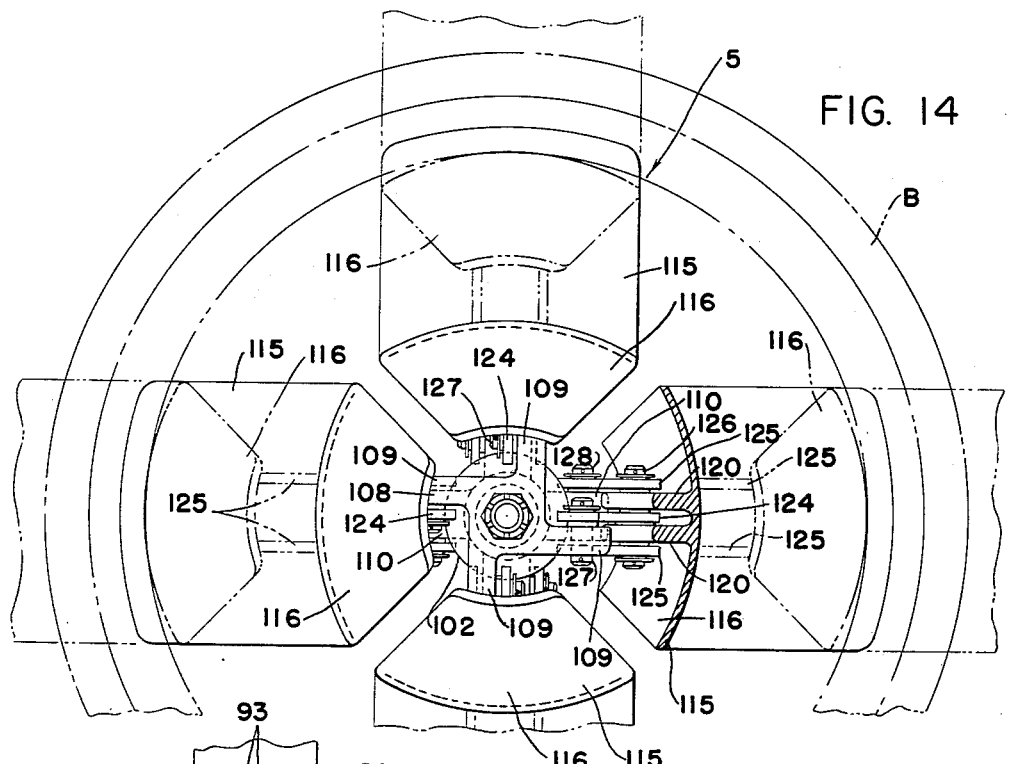

Fig. 14 is an end view of the chuck, partially in section.

Figure 15:
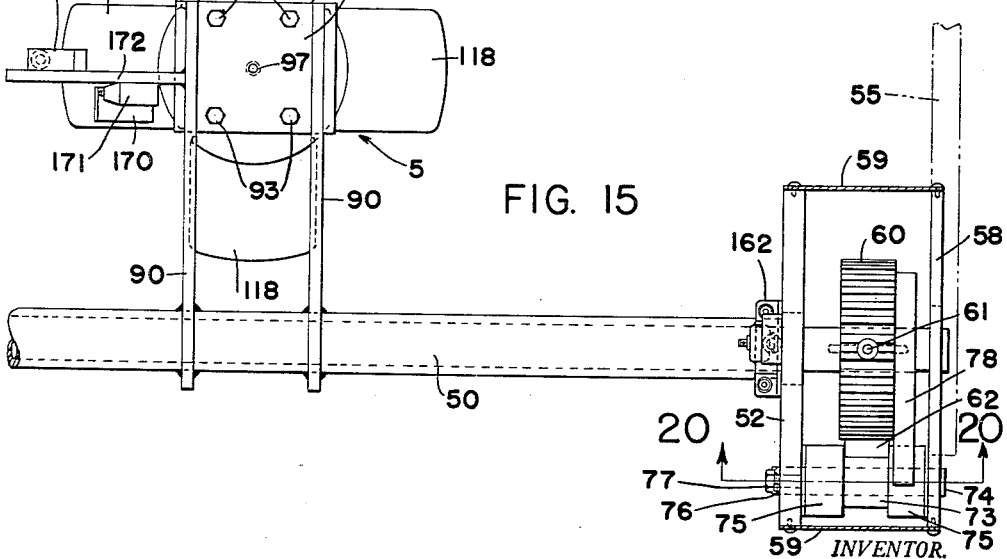

Fig. 15 is a plan view of the chuck and its supporting arm.

Figure 16:
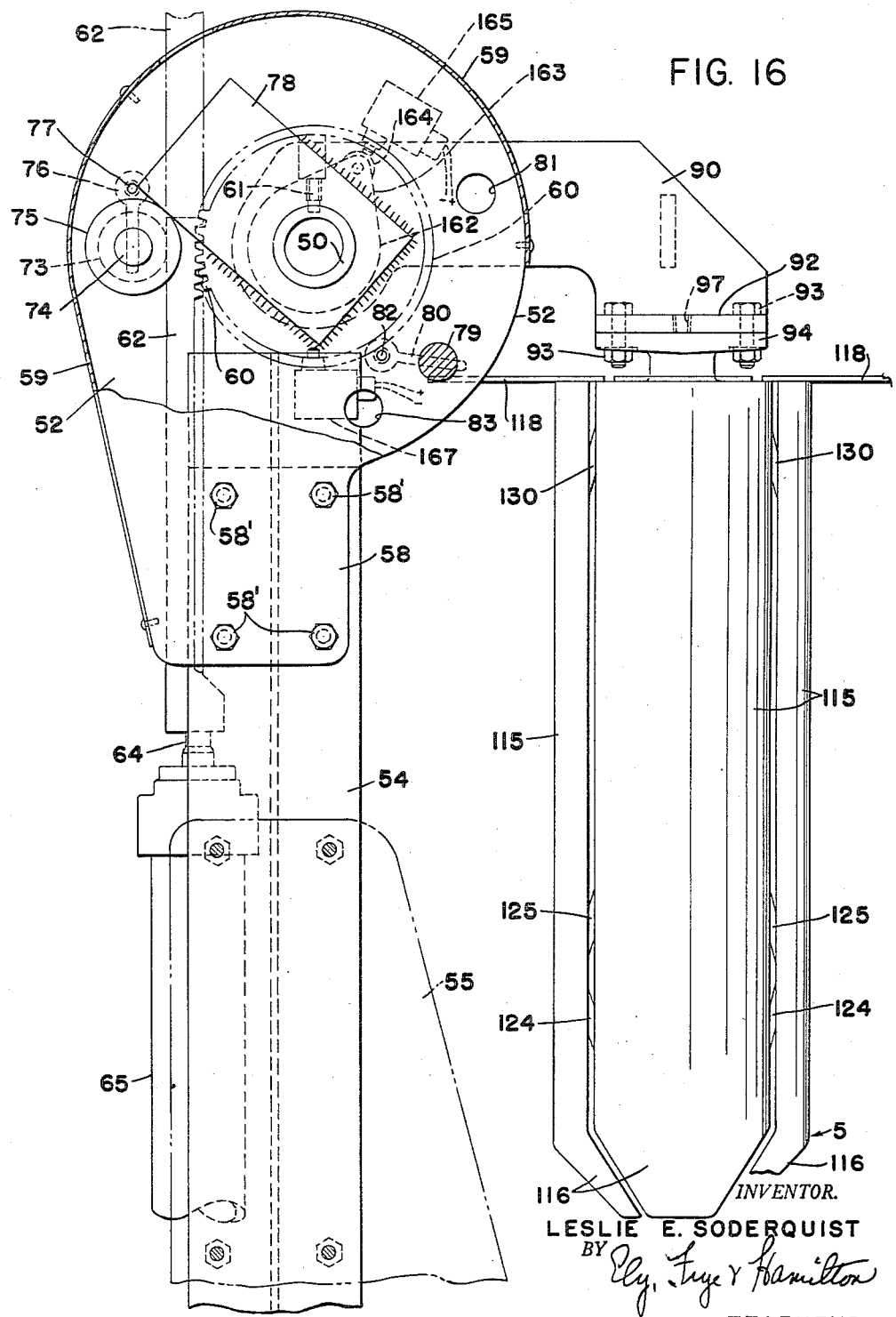
Figure 17:
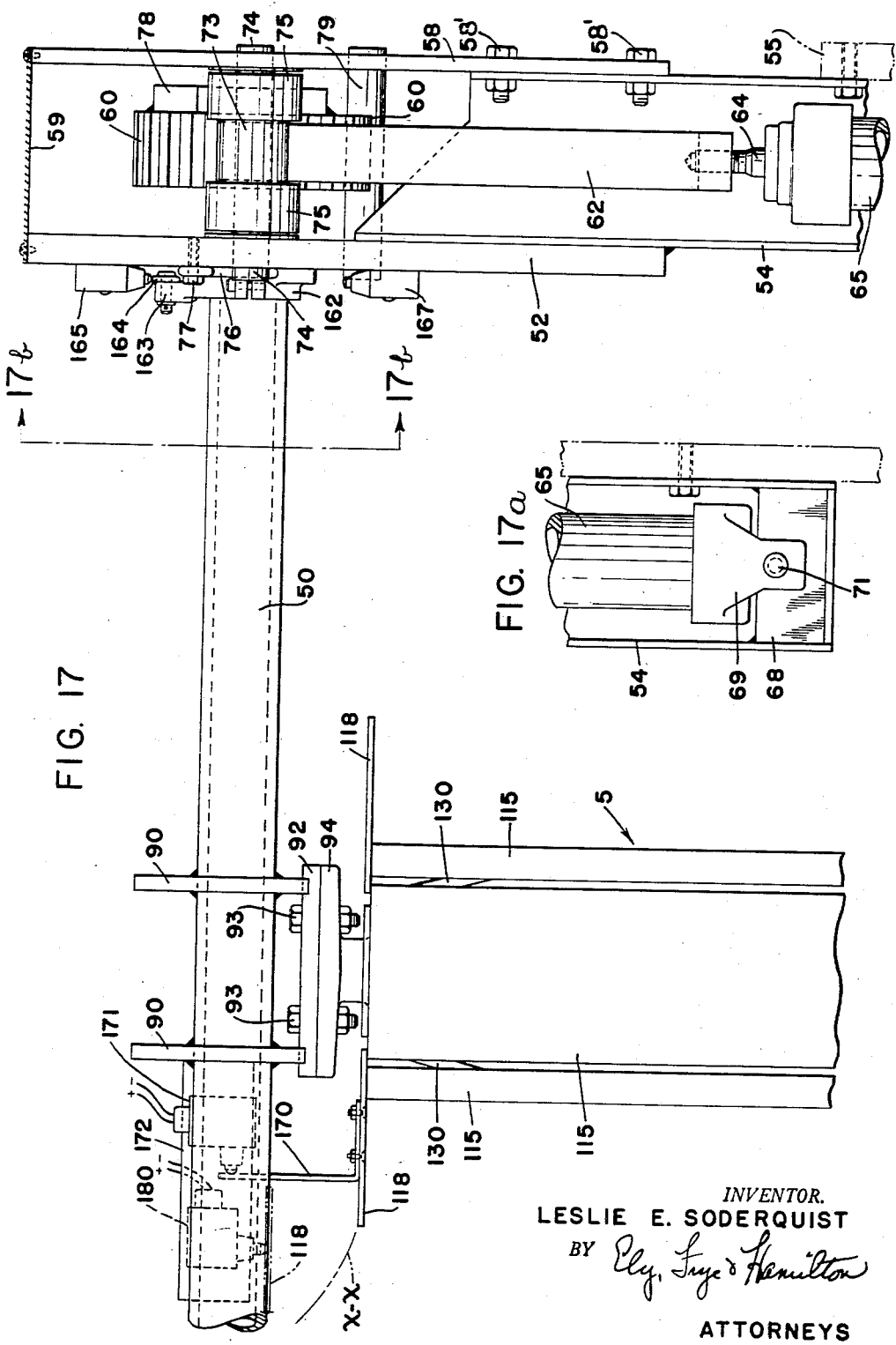

Fig. 16 is a side view of the chuck and its supporting arm, and Fig. 17 is a front view thereof.

Fig. 17a is an extension of Fig. 17 showing the lower end of the cylinder which operates the transfer devices.

Fig. 17b is a section on the line 17b—17b of Fig. 17.

Figure 18:
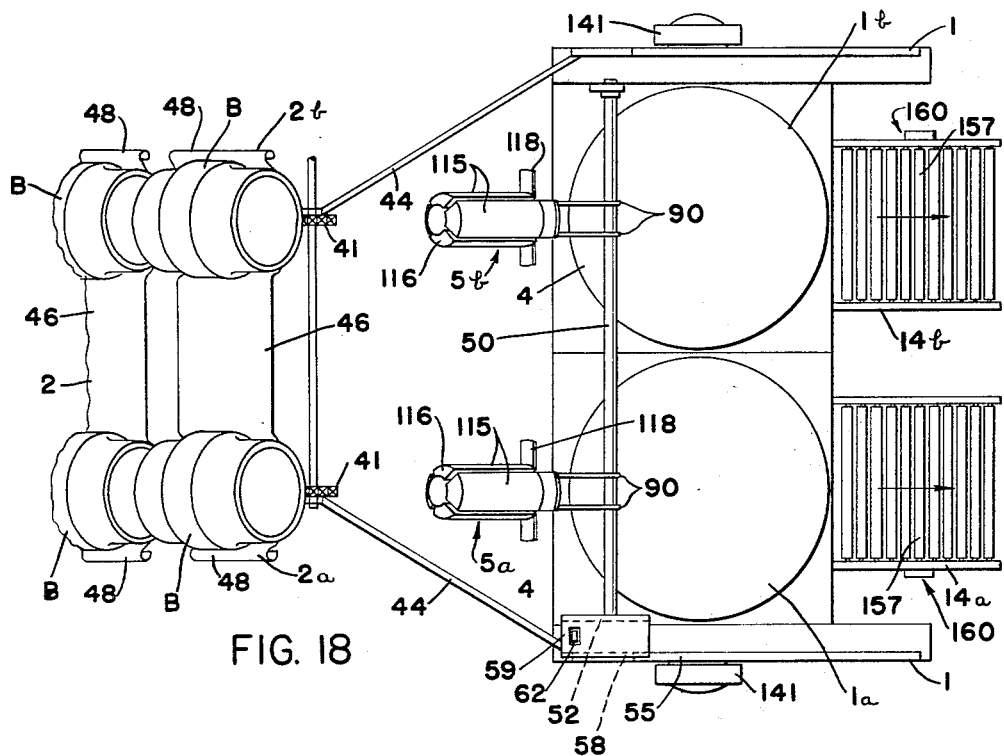

Fig. 18 is a plan view of the installation shown in Fig. 1 with a dual press installation.

Figure 19:
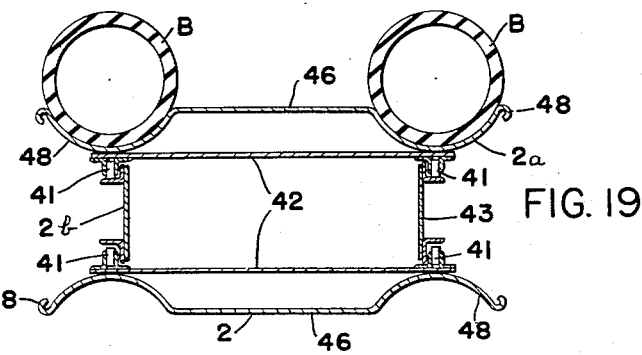

Fig. 19 is a section on the line 19—19 of Fig. 1.

Figure 20:
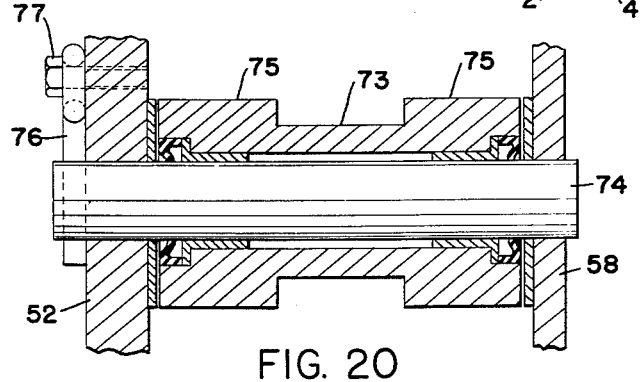

Fig. 20 is a section on the line 20—20 of Fig. 15.

Fig. 21 is a side view of the telltale device which controls the operation of the feeding mechanism by the passage of the tires from the press.

Fig. 22 is a cross section on the line 22—22 of Fig. 21.

DESCRIPTION OF BAND AND TIRE HANDLING MECHANISM

(a) Dual press and automatic band feeding

The description to be given deals first with an installation in which a dual press is fed by a conveyor mechanism which automatically feeds uncured bands into the units of the press. In this connection, reference is made particularly to Figs. 1, 18 and 19. In this portion of the specification the letters a and b are used to distinguish between the two sets of instrumentalities which operate in conjunction with each unit of a dual press. In other parts of the specification and drawings the letters are omitted from the numerals.

In thes views the numerals 1a and 1b refer respectively to two units or sections of a dual press of the type in which the uncured tire bands B are shaped into tire form and cured. At a convenient location in the front of the press is a conveyor 2 which is made in two sections, 2a and 2b, serving the units 1a and 1b, respectively. Each press has a stationary lower mold section 3 and a movable upper mold section 4.

Located on the press structure are two transferring elements, in the form of chucks, which are contracted to receive the bands B and expanded when the bands are in place to grip the bands from the interior.

These two transferring elements are indicated as a whole by the numerals 5a and 5b, respectively. Each is so mounted and arranged that it is raised in position to receive an uncured band, as in Figs. 1 and 18. When the bands are over the chucks, the chucks are expanded to grip the bands, as in Figs. 2, 3, etc. The transfer elements are then shifted so that each is over its respective former 6 (as in Fig. 7), whereupon each chuck is contracted so that its uncured band B will drop off the chuck and over the former in registry with a lower mold section 3, as in Fig. 8. As soon as the chucks are contracted to deposit their bands about the respective shaping mechanisms, a switch is actuated by which the transfer devices return to their former position to receive fresh uncured bands.

By this switch the press-operating mechanism is started which closes the press by the downward movement of the upper mold sections. When the press is fully closed, a timer device (not shown) is set in operation. The closing of the press is done in a manner familiar to the art and there is no necessity of describing the mechanism. Neither is there any necessity for entering into details as to the construction and mode of operation of the timers, for devices constructed to control the operation of such presses are well known in the art. It is sufficient to say that once the timer is set in operation, its functions proceed automatically through a cycle of press operation. It will be noted that the chucks will bring any out-of-round bands into true cylindrical form so that they register more accurately on their seats in the lower mold sections. This is an important feature of the invention because, in conveying and storing uncured tire bands, they will frequently get out-of-round and thus be difficult to locate in the mold. The mechanism which is shown as the preferred form of transfer device corrects this condition.

Figure 2:
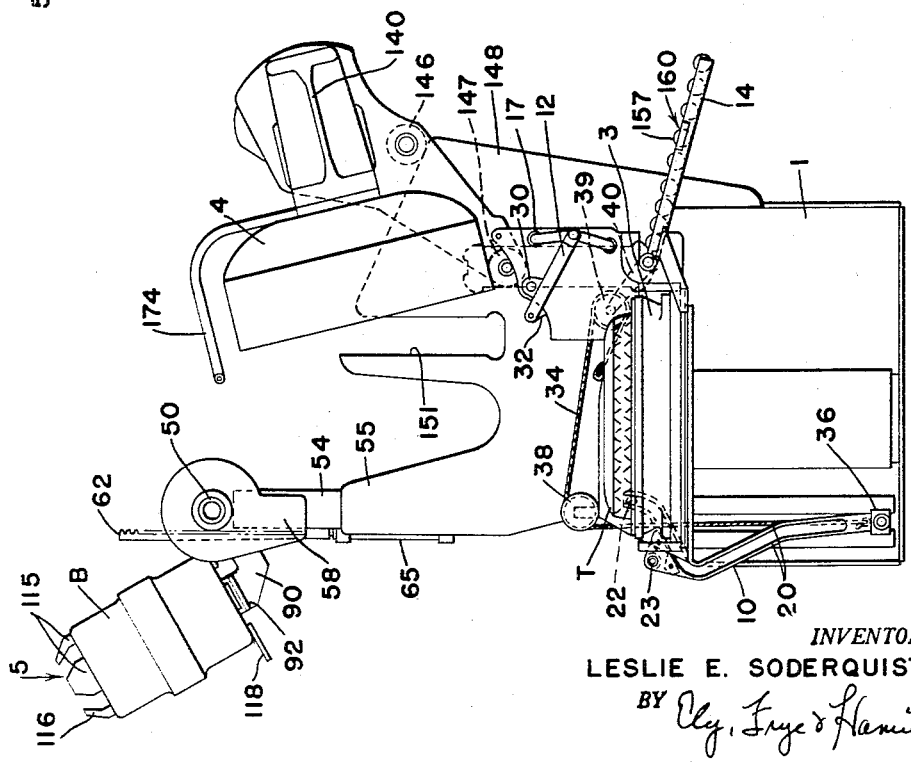
Fig. 2 is a view showing the press opened with the cured tire in the lower mold section.

As the press closes, as shown in Fig. 1, the band is shaped and then held between the two mold sections while under internal pressure until the cure is completed. The timer now starts the press on its opening movement. When the press is fully opened, as shown in Figs. 2 and 9, with the cured tires T in the lower mold sections, the shaping mechanisms will be actuated which raise the cured tires from the lower mold sections to the position shown in Fig. 3.

When the tire is raised, the shaping mechanism, if in the form of a diaphragm 6, is stripped from the interior of the tire by separating the two diaphragm rings. At the same time, stripping arms move beneath the cured tire and assist in the stripping operation.

These stripping arms constitute a means for ejecting a cured tire from the press. They may be in the form shown in Patent No. 2,832,991 or of the improved type shown in Patent No. 2,832,992, and consist of a forward stripping arm 10 and a rear stripping arm 12. This arrangement is for a rear unloading press; for a front unloading press, the position of the arms would be reversed.

At this point it is sufficient to state that the cured tire is raised to the level of the upper end of the diaphragm and is tilted so that it will pass by gravity to the front or back of the press, depending upon the direction in which the press is to be unloaded. This is done by raising one of the arms to a degree sufficiently greater than the elevation of the other arm to cause the tire to tilt at an angle to be discharged onto an off-bearing conveyor.

As shown herein, there are two conveyors 14a and 14b, which are preferably gravity conveyors and may discharge on a further conveyor, not shown, which takes the cured tires to inspection and further handling.

When the cured tire or tires have passed out of the press, the arms 10 and 12 are returned to their inactive positions, as shown for example in Fig. 7.

Figure 3:
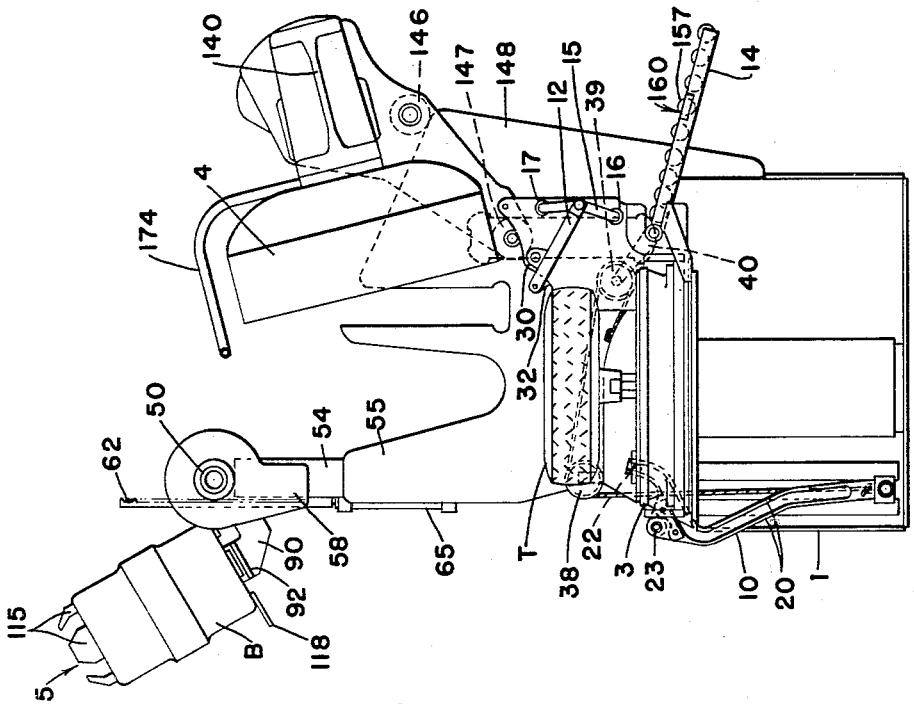
Fig. 3 shows the cured tire lifted by the former or diaphragm.

In idle position, the forward arm 10 is lowered so that its upper end is substantially at the level of the lower mold. The rear arm 12 is swung out of the way to the rear of the press. This position is shown in Figs. 2, 3 and 7.

Figure 4:
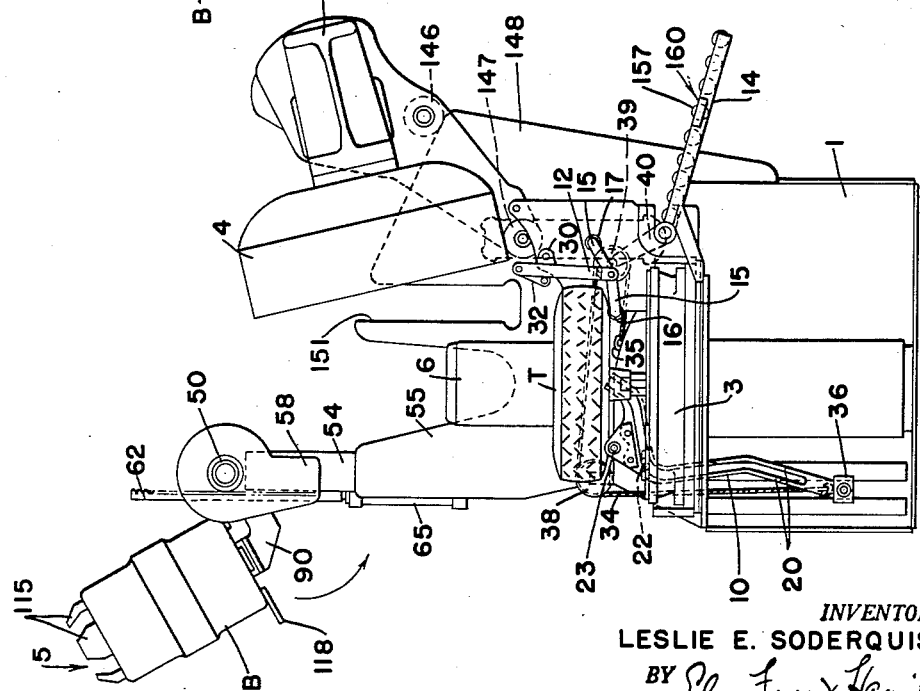
Fig. 4 shows the stripping arms moved beneath the tire, the diaphragm expanded and stripped from the cured tire.

The cured tire T being raised, by the elevation of the former, both arms are moved inwardly to positions below the tire, as in Fig. 4. They are then moved upwardly, lifting the tire to the top of the expanded diaphragm or former, which has during this operation been moved downwardly onto its seat in the lower mold section 3. This is seen by comparing Figs. 4 and 5.

Figure 5:
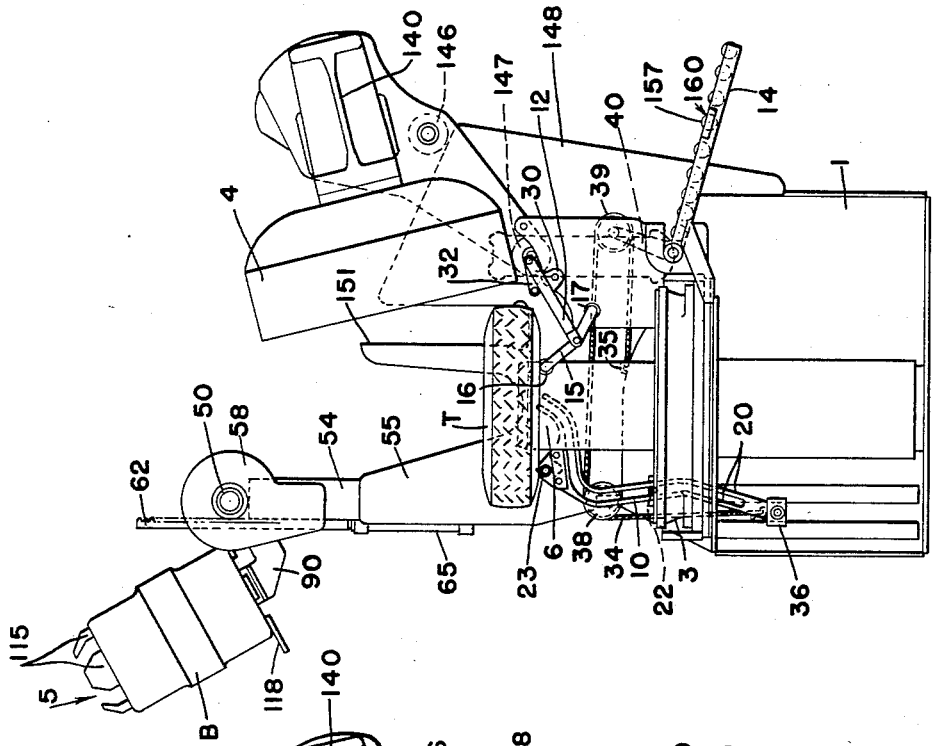
Fig. 5 shows the diaphragm lowered and the stripping arms raised to the position where the tire is at the level of the top of the extended diaphragm.

It will be seen in Figs. 5 and 6 that the rear stripping arm 12 has a cross beam or frame 15 at its outer end which is equipped with rollers 16 and 17 and that, when the arm 12 is moved to its innermost and raised position, the frame and its rollers 16 and 17 form an inclined slideway over which the cured tire may move by gravity. The raised position shown in Figs. 5 and 6 is the upper level of movement of the arm 12.

It will also be noted that the arm 10 consists of two parallel rails 20 which are cam rails and formed in the reversed curve formation shown in the several views. These rails ride over cam rollers 22 mounted on the bed of the press. At a point somewhat below the upper end of the cam rails is a cross bar 23. As the rails 20 are elevated with the movement of the rear stripping arm 12, the cross bar 23 moves from a position below the front of the mold, around and over the front of the mold and into position beneath the cured tire. This is seen by comparing Figs. 2 and 3 with Fig. 4.

Continued upward movement of the arm 10 moves the cross bar 23 in a substantially straight line in conformity with the upward movement of the rear arm 12. However, the arm 10 continues to move upwardly after the arm 12 has reached the upper limit of its movement and is guided inwardly by the configuration of the rails 20 so that it passes upwardly and over the top of the diaphragm as shown in Fig. 6.

The action just described causes the tire T to tilt backwardly to an angle which causes it to slide by gravity over the rollers 16 and 17 and be discharged on a conveyor 14a or 14b, as the case may be. These conveyors are of the roller type over which the tires move by gravity.

The stripping arms 10 and 12 are actuated in timed relation by any suitable mechanism, an example of which is shown herein. Each side of the arm 12 is provided with a bearing lug 30 by which it is pivoted to the frame of the press. The arm may be raised and lowered by a crank arm 32 from any suitable press operating mechanism.

A suitable means for actuating the arms 10 are chains or cables 34, a chain or cable being anchored at one end to the press as at 35, the other end being attached to the lower end of its respective rail 20 through a block 36. Each cable is trained over a stationary pulley 38 mounted on the front of the press and over a movable pulley 39 at the rear of the press. The pulley 39 is carried by a swinging operating arm 40 which, when in the forward position shown in Figs. 2, 3 and others, causes slack in the cable 34 and the forward stripping arm is lowered by gravity to its inoperative position. When each operating arm 40 is rocked to the rear, its stripping arm 10 is raised through its successive positions as will be seen by following the movement of the arm as shown in Figs. 4, 5 and 6.

(b) The band conveyor

In the dual type press, the conveyor 2 for the uncured bands B consists of two parallel chains 41 which are guided on inclined trackways 42 on a frame 43 located adjacent the press and which may be held in proper relation thereto by braces 44 extending from the press to the frame. Pivotally mounted across the chains are a series of carriers 46 provided with troughs or buckets 48 to receive the uncured bands. The conveyor operates as a storage place from which the press is supplied with uncured bands as required, and will normally be supplied with sufficient bands to keep both molds in operation.

The conveyor is operated in accordance with the requirements of the press by a motor, not shown, and as it moves over the top, the carriers turn over and the bands are delivered to the transfer mechanism as required by the press operation.

In the form shown in Figs. 1, 18 and 19, the buckets or carriers are in pairs to feed the tire press units, but if the press were a single press only a single set of carriers would be provided.

In certain aspects of the invention it is not essential that a conveyor mechanism be employed and the transfer devices can be loaded by hand. In such an arrangement it would be preferable to hold the transfer device or devices at a lower level for hand loading. For example, in Fig. 9 the transfer device, when in position to receive uncured tire bands, is shown as horizontal or slightly tilted, within easy reach of the operator.

(c) The band transfer operating mechanism

The transfer device or devices are carried by and preferably mounted radially of a rock shaft 50 which extends across the press and has its ends mounted in bearings at either side of the press. At one side of the press, the shaft rotates in a plate 52 which is welded to the inside surface of the upper end of a vertical I-beam 54, which is in turn bolted to a vertical extension 55 rising from a front corner of the press. The upper end of the plate 52 is substantially circular, as shown in Fig. 16. The end of the shaft 50 is extended beyond the plate 52 and is reduced and received at the outer end in a cover plate 58 bolted at 58' to the outer surface of the I-beam 54. The upper end of the cover plate 58 is substantially circular corresponding to the plate 52, and these portions of the plates constitute a housing to receive the mechanism by which the shaft is oscillated. Surrounding the housing is the plate 59.

Keyed by pin 61 to the end of the shaft 50 is an operating gear 60 which is in mesh with a vertical rack 62 located at one side of the shaft and attached to the upper end of a piston rod 64, the piston of which is located in the hydraulic cylinder 65. This cylinder is located at the front of the I-beam 54, where it is supported on a bar 68 extending across the beam and through a clevis 69 on the base of the cylinder. A pin 71 holds the cylinder in place (see Fig. 17a).

The rack 62 is held in engagement with the gear 60 by means of a roller 73 which is rotatable with a shaft 74 set in the plates 52 and 58. This roller has a central reduced portion which bears against the rear side of the rack and two enlarged portions 75 at either side thereof. A pin 76 held in place by a bolt 77 releasably holds the shaft in position.

Welded to the outer face of the gear 60 is a rectangular stop plate 78. The shaft 50 rotates from its upper raised position, as shown in Fig. 1 for example, to its lowered vertical position in register with the former or diaphragm as shown in Fig. 8, in the direction shown by the arrows in Figs. 1 and 4. This arc is preferably approximately 150° so that the chucks are directed upwardly in position to receive the uncured bands as they are delivered by the conveyor 2. To locate the chuck in its vertical or lowered position, the plate 78 contacts a flanged portion of the roller 73, while to hold the chuck in its raised position a rod 79 is inserted across the plates 52 and 58 in the path of the stop plate 78. A pin 80, which is held in position by a bolt 82, holds the rod in position. If manual loading is to be employed, the rod 79 is shifted upwardly to a position indicated by the holes 81 so that the arc of movement is approximately 90°. Other pairs of aligned holes 83 allow for approximately 180° if it be found to be desirable to move the chucks to positions where they point upwardly when receiving the bands, as might be the case with some other type of automatic conveyor for the uncured bands. Other angular positions may be employed, depending upon the requirements of any installation.

(d) The chucks

As noted heretofore, the invention is shown with two chucks for dual press operation. As both chucks are the same and as one chuck alone may be used with a single type press, the description will be addressed to a single chuck.

The chuck, per se, is indicated by the numeral 5. It is carried on the end of two parallel, angular arms 90 which are welded to the shaft 50 in alignment with the flight of the conveyor which delivers a band to the chuck and with the former which receives the uncured band. Across the end of the arms 90 is affixed a plate 92 to which is secured, by bolts 93, the flange 94 of a pneumatic or other fluid-operating cylinder 95 which expands and contracts the chuck. A port 97 in the plate 92 provides means for attachment of the flexible hose 98 by which pressure is transmitted to and from the cylinder through control valves which are not shown but which are operated at the proper times, as will be described.

To the outer end of the cylinder 95 is attached an elongated cylinder head 100, which is in communication with the outer end of cylinder 95. The lower end of head 100 is closed by the packing gland 102, and pressure is communicated to the head by a flexible hose connection 104. Pressure is maintained in the head 100 at the same pressure as in the cylinder 95 but, due to the differential effective areas, pressure admitted to the cylinder 95 will overbalance the pressure in the head 100. The piston rod 106 passes through the gland 102 and, carried on the lower end of the rod, is a spider 108 having four radial arms 109 (see Fig. 13).

Located on the side of the head 100 are four lugs or wings 110 (Fig. 12), and at the inner end of the cylinder 95 are four additional lugs 112 (Fig. 11). The arms 109 and lugs 110 and 112 are in alignment.

Each chuck consists of four arcuate panels or segments 115 which are somewhat longer than the width of a band which they are adapted to receive. The outer ends of the segments are turned inwardly, as at 116, so as to guide the band over the contracted chuck. When the chuck is contracted, as shown in full lines in Figs. 10–14, an uncured tire band of the size to which the press is adapted will slip over the chuck and will rest against ledges 118 welded to the lower or inner ends of the segments.

In Fig. 10 the chuck is shown in dotted lines, and in Figs. 6 and 7 in full lines, in the normal expanded condition in the interior of the band B. In this condition the band will be held firmly in position by the pressure exerted against the underside of the piston 105. It will be noted, however that this is not the extreme position or maximum expansion of which the chuck is capable. If there is no band about the chuck when it is expanded by the control devices to be described, the chuck will move outwardly still further, as is indicated by the curved lines $x$—$x$ in Fig. 17, which shows the position of the ledges 118, and this feature is utilized to arrest further operations if a tire band should miss its chuck or if the conveyor 2 is not supplied with bands. This will be described more fully in a later part of the specification.

The expansion and contraction of the chuck is through the movement of the piston rod 106. Located on the interior of each segment 115 between the spider 108 and the lugs 110 is a bearing lug 120, and below the lugs 112 on the inside of each segment is located a second bearing lug 122. A pair of toggle links 124—125 are rotatably mounted on pins 126 in the lugs 120, and each link 124 is connected to an arm 109 of the spider 108 by a pin 127. The other end of each link 125 is connected to a lug 110 by pins 128. Links 130 are connected to lugs 112 and 122 by pins 132 and 133, respectively.

It will be seen that when pressure is relieved from the cylinder 95, the inward movement of the piston rod 106, due to the pressure in the head 100, will cause the segments 115 to move outwardly until their outward movement is arrested by the presence of a band, or until the piston reaches the inward limit of its movement if there is no band in place. Admission of pressure to the inner cylinder 95 will fully contract the chuck and release the band so that it will fall into position around the former or diaphragm and into position on the bead seat in the lower mold section, as shown in Fig. 8.

(e) The press

Only such additional description of the press will be given as will be necessary to understand the manner in which it participates in the functioning of the complete apparatus.

The stationary lower molds are carried on the base 1 and the movable upper molds on a cross head 140 which forms one element of a toggle device, the other element of which is constituted by the side links 141. The links 141 are actuated by heavy bull gears 142 driven by a spur gear 143 and a motor 144. A guiding arm 145 is attached to each side of the cross head and this arm carries two rollers 146 and 147. In the side frame 148 of the press is a vertical slot 150 for the roller 147 and also a parallel, open-ended slot 151 for the roller 146. The upper edge of each frame is inclined backwardly and downwardly to provide a track 153 for the roller 146 when it passes out of the upper end of the track 151.

The result is that during the latter part of the closing movement of the press, the mold section 4 will move toward and from its companion mold section 3 in a straight line, with their faces parallel. This is essential for the forming of the band. On the opening operation, when the upper mold is raised sufficiently to cause the rollers 146 to pass out of the slots 151, they will move downwardly over the tracks 153, causing the upper mold section to tilt backwardly about the axis of the rollers 147 and clear the region above the diaphragm to a sufficient extent to allow the chuck with its band to move into position over and in alignment with the diaphragm, as shown in Fig. 7.

SEQUENCE OF OPERATIONS AND CONTROL MECHANISMS (1) In the following description of the sequence of operations and the control mechanisms for automatic loading of a dual press, it will be assumed that the press is closed, the two tires are within the press undergoing vulcanization, and the chucks or transfer devices are raised and expanded with an uncured band on each chuck.

(2) The period for vulcanization has now expired and the automatic timer energizes the mechanism which starts the press on its opening movement. Before the press is fully opened, a first limit switch, located in the path of the press-operating mechanism, is operated which actuates the diaphragms or tire former units so that they start their upward movement, lifting the cured tires from the lower molds. While this operation is proceeding, the press-actuating mechanism operates a second open limit switch which stops the press in its fully open position.

(3) When the tire formers or diaphragm units reach the upper limit of their travel, with the cured tires raised as shown in Fig. 3, the units operate a third limit switch which initiates stretching of the diaphragms 6, stripping them from the tires, and at the same time the tire-stripping arms 10 and 12 move beneath the tires. This is the condition shown in Fig. 4.

(4) While the diaphragms are stretching, the tire-stripping arms 10 and 12 move to their intermediate position, which supports the tires in a horizontal plane. A fourth limit switch on the arm mechanism stops the tire-stripping arms at their raised position. After a brief interval to allow any condensate or other fluid to drain from the diaphragms, the automatic timer lowers the stretched diaphragms so that the cured tires are at about the top of the diaphragms. This is the state of affairs shown in Fig. 5. When the diaphragms or formers reach their lowermost position, the automatic timer is disconnected and resets itself.

(5) When the diaphragms reach their seats in the lower mold sections, a fifth limit switch is actuated which causes the tire-stripping arms 10 to rise to the position shown in Fig. 6, so that the tires pass out of the press. When the arms 10 reach the upper limit of their movement, they actuate a sixth limit switch which returns both arms 10 and 12 to their idle position.

The steps numbered 1 to 5, inclusive, are characteristic of tire shaping and vulcanizing presses constructed in accordance with other patents and applications of the present applicant and those steps, and the electrical devices and wiring to accomplish the results, are well known to those familiar with this art. Hence, there is no necessity for showing them in this application. It is also believed to be unnecessary to show the electrical circuits which control the band-handling mechanisms as, the location and functions of the various control switches having been disclosed, the design of the circuits is routine for any competent electrician.

(6) As the cured tires move out of the press over the conveyor 14, devices which respond to the movement of the cured tires over the conveyor 14, indicated by the numeral 160, are depressed, which action, through appropriate connections, including the micro-switches 155, opens the valves to the cylinders 65. Each switch 155 is located on the side of the conveyor frame 14 and is immediately below an operating angular arm 156 pivoted at 156a to the frame. Carried in the arm 156 is the shaft 157a of a roller 157 which is held elevated at one side, slightly above the level of the other rollers of the conveyor. A pin 158, mounted in a bracket 158a on the side of the conveyor, holds the arm in elevated position through a spring 159, the end of the shaft being received in an elongated opening 159a in the side of the conveyor. When a tire passes out of the press, the roller 157 is depressed, closing the switch 155. The circuits include holding relays arranged so that after both switches have been actuated this action lowers the racks 62 so that the chucks 5 are swung down and into alignment with the diaphragms, their downward movement being arrested by the contact of the plate 78 with the flange 75, as shown in Fig. 16. As there are two tires, it is essential that both tires be out of the press and, therefore, the circuits are so arranged that both switches must be actuated in order that pressure may be admitted to the cylinders 65.

(7) It will be noted that there is fastened to the shaft 50, adjacent the plate 52, a split collar 162 from one section of which extends an arm 163 carrying a switch actuating roller 164 (see Fig. 17b). Located on the adjacent face of the plate 52 and above the shaft is a limit switch 165, and below the shaft is a second limit switch 167, the position of which latter switch is adjusted to conform to the arc of movement of the chuck 5. When the arms 90, carrying the chucks, reach the lower limit of their movement, the roller 164 actuates the switch 165, which opens the valves which admit pressure to the cylinders 95, thereby collapsing the chucks to the full line position shown in Fig. 10, releasing the bands which drop over their respective formers in registry with the lower mold sections 3. It will be noted that the port 97 is one of small diameter or the valve may be restricted so that the air enters at a slow rate and the movement of the piston 105 is quite slow. The consequent slow collapse of the chuck serves to guide the band over the diaphragm because, when the band is first released, the chuck is only slightly collapsed, so that in effect it acts as an extension of the diaphragm.

(8) When each chuck is completely collapsed, an angular arm 170, which is attached to the underside of one of the ledges 118, actuates a switch 171 which is carried by a lateral wing 172 welded to the side of the adjacent arm 90 (see Figs. 15 and 17). The switches 171 are in series and operate a relay which, through appropriate connections, reverses the valves to the cylinders 65 and the collapsed chucks are returned to raised position. At the same time and through a second relay, the press-operating mechanism is started, closing the press about the bands and formers.

Normally the chucks will be clear of the mold sections 4, but, if not, a safety bar, with which all of the presses are equipped and which is shown at 174 in Figs. 2 and 3, will strike any chuck in its path and the closing movement of the press will be arrested.

When the press reaches its closed position, the automatic timer starts up for the succeeding curing operation.

(9) When the shaft 50 has rotated over a sufficient arc to raise the collapsed chucks to their uppermost position, the stop plate 78 will strike the bar 79, bringing the shaft to a stop. This may be in any position determined by the location of the bar 79, as has been described.

At the same time, the roller 164 will actuate the switch 167. The switch 167 operates a solenoid which closes the circuit to the motor for the conveyor 2, which moves the conveyor for a sufficient travel so that one pair of carriers 46 passes around the upper end of the conveyor travel and the two uncured bands are deposited on the collapsed chucks which are ready to receive them. The switches 171 are located in series in the circuit to the conveyor motor so that the conveyor will not operate unless both chucks are collapsed.

(10) A switch is associated with the line to the motor for the conveyor 2 which is for the purpose of arresting the travel of the conveyor after a pair of tire bands has been discharged from the conveyor onto the chucks. For this purpose a limit switch 178 (Fig. 1) is shown on the conveyor in the path of the band carriers. The switch 178 is also connected through a relay to the valve operating mechanism which releases pressure from the cylinders 95 so that when the conveyor stops, the chucks will be expanded inside of and gripping the bands. Further expansion is prevented by the bands themselves, and as the pressure from the head 100 remains on the expanding mechanism the bands will be tightly held until released by the contraction of the chucks.

(11) The expansion of a chuck is normally arrested by the surrounding tire band. However, should a band miss its chuck or should no band be in position on the conveyor to be delivered to the chuck, the chuck will continue to expand. Provision should be made to take care of such a situation; otherwise, the press would close with none or only one tire in position.

On the wing 172 of each chuck supporting member is located a switch 180 which is so situated as to be in the path of one of the ledges 118 at the base of a chuck segment (Figs. 15 and 17). If either chuck expands beyond its normal band-holding limits, its switch 180 will be actuated by the ledge 118. The switches 180 are connected in series to valves which control the flow of pressure to the cylinders 95 in such a manner that if there are no bands on both chucks the pistons will be reversed and the chucks will collapse. The collapsing of the chucks closes the switches 171 which, acting through the relay, starts up the conveyor 2 to deliver bands to the collapsed chucks. If no bands are delivered on the second operation, the chucks expand again and the operation is repeated until tire bands are located about the chucks. If there is a band on one of the chucks, the fact that the switches 180 are in series insures that no bands will be delivered to the chucks which has a band in place.

In order to prevent the operation of the press if there is a failure to load one or both chucks by the time the tires which are in the press are cured, the switches 180 and 171 are connected to the circuits to the switches 160 so that, if either chuck is fully expanded or fully contracted, indicating in either case that the bands are not in location on one or both chucks, the cylinders 65 will not be actuated and the press will not operate.

The foregoing description applies to automatic loading of a dual press. In the case of a single press, the electrical circuits for automatic operation will be simplified, but the same basic connections are employed.

(12) In the case of manual loading, as provided for in Fig. 9, in which there is no conveyor to feed tire bands to the chucks, the operator will place uncured bands over the chuck or chucks while they are in collapsed position and accessible. When the chuck or chucks are loaded, the operator presses a switch which actuates the valves to the cylinders 95, so that the chucks will be expanded. However, the circuit may be arranged so that the electrical circuit which opens the press will actuate the valves which releases the pressure from the cylinders 95 and expands the chucks. The remaining operations are the same as described in steps 1 to 9, inclusive, except that the provisions for operating the conveyor in step 9 are not present.

If the operator has failed to place a tire band on one or both chucks, the full expansion of the empty chuck will prevent further operation as explained under step 11 above.

RÉSUMÉ

It will be seen from the foregoing that there has been perfected a mechanism used in combination with a press of the band shaping and vulcanizing type which will provide for automatically loading such a press with uncured bands and removing the cured tires. In its ultimate embodiments no manual operations are normally required other than keeping the band conveyors loaded at all times with a sufficient number of uncured bands to keep the press supplied. In the manual loading operation, the feeding of the bands to the presses is automatic, although the chucks have to be loaded manually.

The mechanism is primarily intended for dual presses, but may be adapted with minor changes and simplification to single presses.

It is further to be noted that the automatic loading and unloading features are not necessarily confined to use with and adaptation to presses of the diaphragm shaping type shown in the drawings and described, as much of the mechanism may be adapted to other tire shaping and vulcanizing presses.

The mechanism which constitutes that part of the complete apparatus which removes the cured tire from the diaphragm or former is that form which has been perfected by the applicant and is shown and described and claimed in Patent No. 2,833,992. This was selected for convenience of illustration, but other types of tire unloaders may be used.

The form of conveyor for delivering the uncured bands is also selected for convenience, it being possible to adapt the invention to other types of unloading conveyors.

It is not essential that the transfer device incorporate an expansible chuck to hold the band by pressure exerted outwardly against the interior of the band, for in some aspects of the invention any means for holding and transporting the band into register with the former may be employed. However, the expansible chuck is preferred, one of its advantages being that it will bring an out-of-round band into true circular form, which serves to center the band on the seat in the lower mold section. The outer end of the chuck is reduced so that it will readily enter a band even though it may be out-of-round.

While the foregoing description has been complete and detailed to enable the invention to be understood and practiced by those skilled in the art, adherence to exact details and designs is not necessary, and changes and modifications may be made without departing from the invention.

What is claimed is:

1. In a tire press for shaping and curing unvulcanized tire bands within separable mold sections, said press being adapted when open to receive an uncured band in registry with said mold sections and having stationary members on opposite sides of said mold sections, a movable transfer device supported between said stationary members and having means thereon to hold a band in cylindrical form, means to move said transfer device toward said mold sections, and means to release said band from said transfer device when registered with said mold sections.

2. In a tire press for shaping and curing unvulcanized tire bands within separable mold sections, said press being adapted when open to receive an uncured band in registry with said mold sections and having stationary members on opposite sides of said mold sections, a movable support extending between said stationary members, a movable chuck carried by said support and having a plurality of arcuate segments expansible to grip the inner surfaces of said band, means to expand said chuck segments and to move said support and said chuck toward said mold sections, and means to contract said chuck segments when said band is registered with said mold sections.

3. In a tire press for shaping and curing unvulcanized tire bands within separable upper and lower mold sections, said press being adapted when open to receive an uncured tire band in registry with a lower mold section and having stationary members on opposite sides of said lower mold section, a movable support extending between said stationary members, a movable chuck carried by said support and having a plurality of arcuate segments expansible to grip the inner surfaces of a band, means to expand said chuck segments and to move said support and said chuck toward said lower mold section, and means to contact said chuck segments when said band is registered with said lower mold section.

4. In a tire press for shaping and curing unvulcanized tire bands within separable upper and lower mold sections, said press being adapted when open for removal of a cured tire and to receive an uncured band in registry with a lower mold section and having stationary upright members on opposite sides of said lower mold section, a rotatable support extending between said upright members above said lower mold section, a transfer device carried by said support radially thereof and having means thereon to hold a band in cylindrical form, means to rotate said support and to move said transfer device toward said lower mold section when said press is open and after removal of the cured tire, means to release said band from said transfer device when registered with said lower mold section, and means actuated after release of said band to rotate said support and to move said transfer device away from said lower mold section and to close said press.

5. In a tire press for shaping and curing unvulcanized tire bands within separable upper and lower mold sections, said press being adapted when open for removal of a cured tire from a lower mold section by tire ejecting means and to receive an uncured band in registry with a lower mold section and having stationary upright members on opposite sides of a lower mold section, a rotatable support extending between said upright members above a lower mold section, a transfer device carried by said support radially thereof and having means thereon to hold a band in cylindrical form, means to rotate said support and to move said transfer device when said press is open to register said band with a lower mold section, and means actuated by said tire ejecting means and removal of a cured tire to release said band from said transfer device.

6. In a tire press for shaping and curing unvulcanized tire bands having beaded edges within separable upper and lower mold sections, said press being adapted when open to receive an uncured tire band on a circular seat of a lower mold section and having stationary upright members on opposite sides of said lower mold section, a rotatable support extending between said upright members above said lower mold section, a chuck carried by said support radially thereof and having a plurality of segments over which an uncured band is telescoped when the chuck is collapsed and an expanding mechanism to force the segments outwardly to bring and hold the band in true cylindrical form, means to rotate said support, and means to release said band from said chuck when said support is rotated and place a beaded edge of the band on a circular mold seat when the press is open.

7. In a tire press for shaping and curing unvulcanized tire bands having beaded edges within separable upper and lower mold sections, said press being adapted when open to receive an uncured tire band on a circular seat of a lower mold section and having stationary upright members on opposite sides of said lower mold section, a rotatable support extending between said upright members above said lower mold section, a chuck carried by said support radially thereof and having a plurality of segments over which an uncured band is telescoped when the chuck is collapsed and an expanding mechanism to force the segments outwardly to bring and hold the band in true cylindrical form, and means to rotate said support to locate and then to invert said chuck and place a beaded edge of the band on a circular mold seat when the press is open.

8. In a dual tire press for shaping and curing unvulcanized tire bands within pairs of separable upper and lower mold sections, said press being adapted when open to receive uncured bands in registry with lower mold sections and having stationary members on opposite sides of said lower mold section, a movable support extending between said stationary members, movable chucks carried by said support and each having a plurality of arcuate segments expansible to grip the inner surfaces of bands, means to expand said chuck segments and to move said support and said chucks toward said lower mold sections, and means to contract the segments of said chucks when said bands are registered with said lower mold sections.

9. In a dual tire press for shaping and curing unvulcanized tire bands within pairs of separable upper and lower mold sections, said press being adapted when open for removal of cured tires by tire ejecting means and to receive uncured bands in registry with lower mold sections and having stationary upright members on opposite sides of said lower mold sections, a rotatable support extending between said upright members above said lower mold sections, transfer devices carried by said support radially thereof and having means thereon to hold bands in cylindrical form, means to rotate said support and to move said transfer devices when holding bands and said press is open to register said bands with lower mold sections, and means actuated by said tire ejecting means and removal of cured tires to release said bands from said transfer devices.

10. In a tire press for shaping and curing unvulcanized tire bands having beaded edges within separable upper and lower mold sections, said press being adapted when open to receive an uncured tire band on a circular seat of a lower mold section and having stationary upright members on opposite sides of said lower mold section, a rotatable support extending between said upright members above said lower mold section, a band holding device carried by said support radially thereof and having means to bring and hold the band in true cylindrical form, means to rotate said support, said holding device being movable by rotation of said support into position with the band in register with the circular seat, and means to release the holding device sufficiently to allow the band to slip from the holder but to serve as a guide for the band during its movement onto the circular seat.

11. In a tire press for shaping and curing unvulcanized tire bands having beaded edges within separable upper and lower mold sections, said press being adapted when open to receive an uncured tire band on a circular seat of a lower mold section and having stationary upright members on opposite sides of said lower mold section, a rotatable support extending between said upright members above said lower mold section, a holder for an uncured tire band carried radially of said support, said holder having means to bring the band into true cylindrical form, means to rotate said support and shift the holder to a position with the lower beaded edge of the band in register with the circular seat, and means to release the grip of the holder on the band and allow it to be deposited with its lower edge on the circular seat.

12. In a tire press for shaping and curing unvulcanized tire bands having beaded edges within separable upper and lower mold sections, said press being adapted when opened by relative movement of said mold sections to receive an uncured tire band on a circular seat of a lower mold section, a holder for an uncured tire band, said holder having means to bring the band into true cylindrical form, means to shift the holder to a position within the range of the opening movement of said mold sections and with the lower beaded edge of the band in register with the circular seat, and means to release the grip of the holder on the band and allow it to be deposited with its lower edge on the circular seat, said releasing means being operative concurrently with the positioning of the band over the circular seat.

13. In a tire press for shaping and curing unvulcanized tire bands having beaded edges within separable upper and lower mold sections, said press being adapted when opened by relative movement of said mold sections to receive an uncured tire band on a circular seat of a lower mold section, a band holder normally located out of the path of the opening movement of the upper mold section, said holder having means to bring a mis-shaped band into cylindrical form with its lower beaded edge as a true circle and to hold it in that form, and means operative while the upper mold section is in the opened position to bring the holder over the lower mold section and to operate the holder to release the band and allow it to move downward until the lower edge of the band is on the circular seat.

14. In a tire press for shaping and curing unvulcanized tire bands within separable upper and lower mold sections, said press being adapted when open to receive an uncured band in registry with a lower mold section and having stationary upright members on opposite sides of said lower mold section, a rotatable support extending between said upright members above said lower mold section, a transfer device carried by said support radially thereof and having means thereon to hold a band in cylindrical form, means to rotate said support and to move said transfer device toward said lower mold section, and means to release said band from said transfer device when registered with said lower mold section.

15. In a tire press for shaping and curing unvulcanized tire bands within separable upper and lower mold sections, said press being adapted when open to receive an uncured band in registry with a lower mold section and having stationary upright members on opposite sides of said lower mold section, a rotatable support extending between said upright members above said lower mold section, a chuck carried by said support radially thereof and having a plurality of arcuate segments expansible to grip the inner surfaces of said band, means to expand said chuck segments and to rotate said support and move said chuck toward said lower mold section, and means to contract said chuck segments when said band is registered with said lower mold section.

References Cited in the file of this patent

UNITED STATES PATENTS

| | | |
|---|---|---|
| 1,931,638 | Abbott | Oct. 24, 1933 |
| 2,287,356 | Newman | June 23, 1942 |
| 2,355,597 | Pond | Aug. 8, 1944 |
| 2,696,920 | Anjeskey | Dec. 14, 1954 |
| 2,715,245 | Soderquist | Aug. 16, 1955 |

UNITED STATES PATENT OFFICE
CERTIFICATE OF CORRECTION

March 8, 1960

Patent No. 2,927,343

Leslie E. Soderquist

It is hereby certified that error appears in the printed specification of the above numbered patent requiring correction and that the said Letters Patent should read as corrected below.

Column 3, line 40, for "thes" read -- these --; column 10, line 47, for "chucks" read -- chuck --; column 11, line 28, for "Patent No. 2,833,992." read -- Patent No. 2,832,992. --; column 13, line 2, after "locate" insert -- the chuck in a substantially upright position to receive said band --.

Signed and sealed this 9th day of August 1960.

(SEAL)
Attest:

KARL H. AXLINE
Attesting Officer

ROBERT C. WATSON
Commissioner of Patents